United States Patent
Stark

(10) Patent No.: US 8,488,257 B2
(45) Date of Patent: Jul. 16, 2013

(54) TWO PI SOLID ANGLE HIGH RESOLUTION OPTICAL SYSTEM

(75) Inventor: Daniel Lee Stark, San Jose, CA (US)

(73) Assignee: Daniel Lee Stark, San Jose, CA (US)

( * ) Notice: Subject to any disclaimer, the term of this patent is extended or adjusted under 35 U.S.C. 154(b) by 45 days.

(21) Appl. No.: 13/292,442

(22) Filed: Nov. 9, 2011

(65) Prior Publication Data

US 2013/0114147 A1    May 9, 2013

(51) Int. Cl.
*G02B 9/00* (2006.01)
*H04N 7/00* (2011.01)

(52) U.S. Cl.
USPC .............................. 359/754; 348/36; 348/38

(58) Field of Classification Search
CPC ........ G02B 13/06; G02B 13/16; G02B 17/061; G02B 27/0025; G02B 3/00; H04N 5/225
USPC ..................... 348/36, 38; 359/725, 739, 754, 359/793, 794; 385/120
See application file for complete search history.

(56) References Cited

U.S. PATENT DOCUMENTS

| | | | |
|---|---|---|---|
| 3,455,223 A | 7/1969 | Spoelhof et al. | |
| 4,323,925 A | 4/1982 | Abell et al. | |
| 5,004,328 A * | 4/1991 | Suzuki et al. | 359/664 |
| 5,012,081 A * | 4/1991 | Jungwirth et al. | 250/203.6 |
| 5,159,455 A | 10/1992 | Cox et al. | |
| 5,311,611 A | 5/1994 | Migliaccio | |
| 5,349,180 A | 9/1994 | Vaughan | |
| 5,572,034 A | 11/1996 | Karellas | |
| 6,003,998 A * | 12/1999 | St. Hilaire | 359/859 |
| 6,320,703 B1 | 11/2001 | Chen et al. | |
| 2002/0085278 A1 | 7/2002 | Kolosowsky | |
| 2002/0096629 A1 | 7/2002 | Korein | |
| 2009/0303592 A1 | 12/2009 | Oakley | |
| 2010/0200736 A1 | 8/2010 | Laycock et al. | |
| 2011/0211106 A1 * | 9/2011 | Marks et al. | 348/340 |
| 2013/0076900 A1 * | 3/2013 | Mrozek et al. | 348/144 |

* cited by examiner

*Primary Examiner* — David N Spector

(57) ABSTRACT

This invention is a wide field surveillance, monocentric, refractive optical system with inherent features being, non-mechanical, compact, high resolution, a field of view up to two Pi steradians solid angle. The optics design uses a single optical system and multiple flat image collection devices. Multiple fiber plates translate and map the image off of the curved image surface to the flat image collection devices. The fiber plates also act to translate the image into a larger volume as compared to the curved image surface, allowing required volume for the multiple image collection devices. This invention uses a single refractive optical system with multiple CCD or CMOS detectors. Advantages over prior art are simple optical system, rugged optics, high resolution and single optics which is easily manufactured.

5 Claims, 13 Drawing Sheets

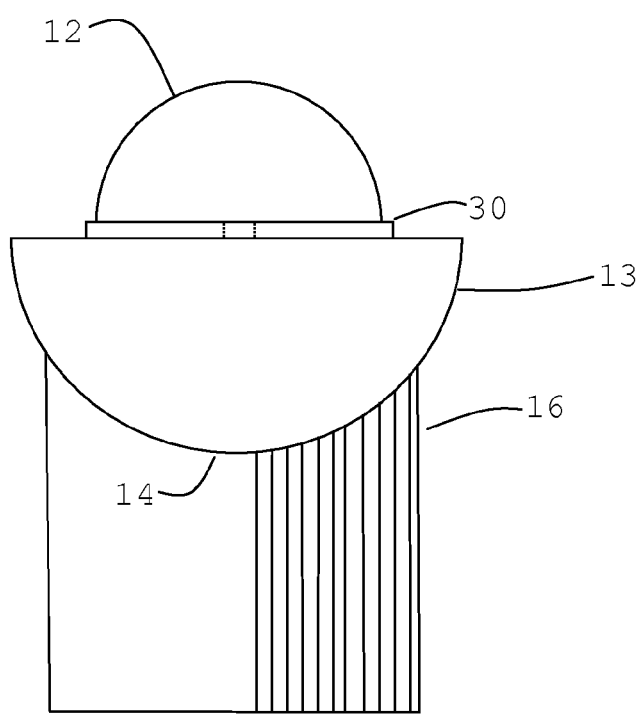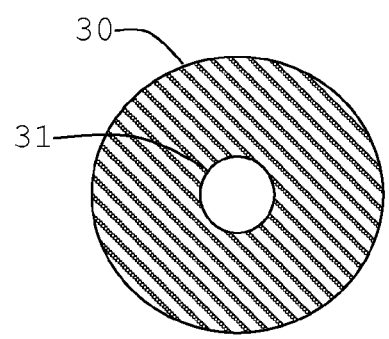
Fig. 3
Prior Art
Fig. 4
Prior Art

TWO PI SOLID ANGLE HIGH RESOLUTION OPTICAL SYSTEM

BACKGROUND OF THE INVENTION

1. Field of Invention

This invention discloses an optical imaging system design concept that supports close to a two pi steradians solid angle field of view or any subset solid angle thereof using one optical system with multiple flat image collection devices. The optical design maintains high resolution over the entire two pi steradians solid angle field of view and minimal spatial distortion.

2. Description of Related Art

There are many surveillance applications, for example, but not limited too: commercial surveillance, security situations, traffic control, robotics, and military applications. Desirable features are wide field of view, high resolution over the wide field of view, and a non mechanical system.

There are three general approaches to this surveillance requirement, a mechanical scanning system, a wide field of view optical system, with an optically compressed image to a smaller field of view, or multiple optical systems. The latter two approaches being static collection systems, preferred over the scanning mechanical approach because of simplicity and reliability.

A major advantage of mechanical systems is that they offer a wide field of view with high resolution. The disadvantages are that mechanical systems are typically bulky, provide instantaneous limited field of view and subject to failure because of moving parts. These systems provide wide field with potentially high resolution over the wide field but at the cost of limited integration times and image blur for area arrays, and limited revisit times.

Another group of mechanical scanning systems use time delayed integration with charge coupled devices. Image blur is mostly overcome, and integration times are longer. The main disadvantage is the mechanical system.

Static surveillance systems have been preferred over mechanical systems because of simplicity and higher reliability.

One class of static systems use a single optical system to optically compress a wide field of view image into a narrow field of view image that fits the image collection device. These existing wide-angle surveillance systems use several optical compression techniques, which can be categorized into fish eye lens, complex refractor optical systems, parabolic reflectors or compression using a tapered fiber plate. These systems optically compress the wide field of view to fit image collection's narrow field of view, at the sacrifice of resolution. The images are not natural as seen by the eye having major spatial warp or fish eye effect, which can be compensated by image processing. However, the resolution at the periphery cannot be compensated, thus degrading the image resolution over the wide field of view.

Another class of static systems is the multiple optical systems. These designs use multiple optics each with it's own optical system and image collection device. The independent images are stitched together using software to provide a single image and correct for image residual distortion. The multiple optical systems drive complexity, size and cost. Electronics has miniaturized, but the optics has become more complex and has not reduced in size.

A serious optical design issue shared by all systems is that the natural focal surface is curved whereas the image collection devices are planar. The natural focal surface is spherical because of the physics of spherical lenses and refraction. Flattening and non spherical lens combinations are added to the optical designs to compensate and flatten the focal surface, which complicates the optical design and manufacturing costs. Curved image collection devices such as film on a curved surface have partially addressed this issue; however, most electronic image collection devices are typically flat.

Fiber products offer a simple way to map an image from a spherical focal surface to a planar detector surface. There are three fiber assemblies that are used to map the image from the spherical surface to a flat planar surface. These three assemblies are, (1) mineral fiber plates, which can be synthetically grown, (2) artificial fiber plates also referred to as fiber faceplates, and (3) fiber cables.

Mineral fiber plates are minerals such as ulexite that have a crystal growth forming parallel optical fibers that transmit light. These minerals thus map an image from one end of the crystal to the other without image distortion. Ulexite is commonly called TV rock in recognition of this phenomenon. Many minerals exhibit this phenomenon, and can be synthetically grown.

Artificial fiber plates are very short fused fiber bundles manufactured by laying the individual clad fibers parallel as possible, then fusing the matrix. Image distortion cannot be avoided, and the longer the length, the more image distortion. These optical elements are also referred to as faceplates, and most commonly used as a window over detector arrays. The short thickness avoids noticeable image distortion. The cladding introduces some obscuration and can also introduce a chicken wire effect on the image. Current artificial fiber plates advertise 70% throughput based on cladding obscuration.

The third fiber assembly is a fiber cable, which is used in borescopes. These cables are made by winding a clad fiber in a circle, fusing one section of the fiber bundle, and slicing the bundle at the fused section. The fibers are thus coherent at the point where they are sliced, and any shortening of the fiber cable introduces image distortion such as forming one end of the fiber cable spherical. The fiber cladding introduces obscuration by blocking part of the image. Too much fiber cladding results in what is referred to as a chicken wire effect on the image.

U.S. Pat. No. 3,455,223 by Charles P. Spoelhof et. al., teaches a optical imaging design using four half ball lenses positioned with a common center as the imaging device, which provides a spherical image surface with an air gap between the image surface and the last half ball lens on the image side. Film is used as the image capturing device with the film curved to best fit the spherical image surface. The design predates electronic image collection devices, thus restricts usage to film.

U.S. Pat. No. 5,004,328 by Masayuki Suzuki et al. teaches the advantages of concentric refractive optical designs with examples.

Suzuki teaches an imaging device using monocentric spherical half and full ball lenses with the aperture stop in the center, and a fiber bundle to translate the image from the spherical image surface to a flat detector.

The fiber's numerical aperture limits the field of view. To accommodate the fiber's numerical aperture limitations and achieve a wider angle, the fibers at the periphery of the image are positioned perpendicular to the spherical image surface.

Suzuki does not provide discussion on how to maintain avoid image distortion in the custom fiber bundle. Positioning fibers peripherally and maintaining image coherence at both ends of the cable is a very difficult and labor intensive operation, thus conceptually understandable, but in practice extremely difficult to achieve, resulting in an impractical solution. Suzuki does not consider multiple fiber plates juxtaposed with multiple planar detectors to provide a wider field of view. Suzuki does not identify fiber plates either artificial or natural but only identifies artificial optical fiber cables. The concept of mapping the curved focal surface to a planar image collection device using fiber cables is not practical because fiber cables are not coherent over their length, but only at the position they are sliced. Any reduction in length introduces image distortion, such as shaping one end spherical. Leaving the fiber bundle planar will result in high out of focus.

U.S. Pat. No. 5,012,081 by Douglas R. Jungwirth et al. teaches a limited wide angle star tracking device using monocentric spherical half and full ball lenses in a refractive design with the aperture stop in the center and holographic lenses at the spherical detector surface. Jungwirth teaches the use of multiple planar detectors placed on the spherical focal surface. The planar detectors on the spherical image surface will cause a significant out of focus display not suitable for an image; however, for points of light such as stars, the use of holographic lenses and image processing compensates.

Jungwirth teaches the use of fiber bundles to translate the image from the spherical image surface to a planar detector image surface. However, Jungwirth is using commercial fiber cables to coherently transfer the image from the image surface to a planar image surface. The image translation is not truly coherent as discussed above in U.S. Pat. No. 5,004,328 by Masayuki Suzuki et al.

Jungwirth does not consider natural fiber plates, which do not introduce any image distortion over their length, thus allowing spherical shaping.

Each fiber in the artificial fiber bundles has a very small active aperture because of the fiber cladding surrounding each active transmitting fiber. Jungwirth does not consider natural or artificial fiber plates with a higher ratio of active fiber aperture as compared to area between the fibers.

Jungwirth teaches the use of flexible fiber bundles to translate the image to a higher volume space. Jungwirth does not consider the use of fiber plates, and does not consider the inherent ability for fiber plates placed vertical to a spherical surface to translate the image surface to a higher volume area required to accommodate the detectors and electronics.

Jungwirth's refractive optical design limits the field of view for star tracker purposes rather than wide angle surveillance.

Jungwirth only considers an optical stop at the optics monocentric center.

U.S. Pat. No. 6,003,998 by Pierre St. Hilaire teaches a high resolution, wide angle reflective imaging device with use of multiple detectors and multiple juxtaposed commercially available fiber plates, referred to as faceplates, to transfer the image from the spherical image surface formed in free space to the planar image detectors.

Hilaire does not consider a refractive optical system and points out the inherent advantage of a reflective system not having any chromatic dispersion. However, a ball lens design can minimize the chromatic dispersion with careful design, thus minimizing the effect to acceptable levels.

Hilaire's reflective optical design has several disadvantages when compared to a reflective optical design. The reflective design has considerable central obscuration because the detector array and secondary mirror and potentially the electronics are located in front and in the center of the primary mirror, which creates a large instrument as compared to a refractive design. The reflective imager cannot be inconspicuously located because the secondary, and electronics must protrude from any surface whereas with a reflective design only the outer image side half-ball lens needs protrude from a surface.

A refractive system thus lends itself to inconspicuous packaging because all of the electronics and the image side of the optics may be hidden from view beneath a surface. The refractive imaging system can be easily installed onto an airframe because only the refractive object side lens need protrude outside the aircraft outer mold line.

The reflective telescope design is more expensive, and easily misaligned as compared to a refractive design. In the reflective design, a stiff structure is required to hold the primary, secondary and the sensors on the spherical focal surface. A refractive system can be a single unit with the half ball lenses acting as both the supporting mechanism and the active optical elements. Furthermore the fiber plates or faceplates in a refractive system can have the fiber plates mounted to the half ball image surface, which is the curved focal surface. Thus a refractive system lends itself to be smaller than the refractive design, and to be a single rugged unit with all of the optics, fiber plates and detectors a single unit without the requirement for a stiff supporting structure to maintain alignment.

Ball lenses are more easily manufactured and therefore less expensive than the reflective optical elements. Ball lens designs can also minimize chromatic and spatial distortion, which competes with the reflective design approach. The refractive system allows for miniaturization wherein only the diffraction limit is an issue.

Hilaire teaches the use of commercially available fiber optic faceplates to map an image from a spherical surface to a planar surface, but does not discuss specifically the origin or issues associated with faceplates. A fiber optic faceplate is an optical mosaic in which fibers less than an inch in length are mechanically positioned as parallel as possible, then fused together to form a vacuum-tight glass plate. Because faceplates are made up of millions of small fibers sealed together under pressure and at a temperature so high that glass becomes slightly viscous, they always present some degree of image distortion. Faceplates are also restricted in length, unlike natural fiber plates.

Hilaire does not consider natural fiber plates. The main disadvantages of a commercial fiber faceplates are their image distortion, limit on length and high expense.

The artificial fiber's cladding reduces the active fiber plate's active aperture, and can cause a chicken wire effect on an image; however, current fiber faceplate manufacturers advertise no chicken wire effect.

Naturally occurring fiber plates do not have any image distortion or chicken wire effect, examples of such minerals are ulexite, trona and halotrichite, which can be synthetically grown. These natural mineral fiber plates do not introduce image distortion over their entire length, and allow lengths much longer than an inch without image distortion.

U.S. Publication. No. 2010/0200736 A1 by Leslie Charles Laycock et. al., describes a method to translate a curved focal surface onto an image plane. FIG. 1 shows a ball lens, 11 with input radiation 1, focusing onto the ball lens's opposite surface where in a fiber plate, 16 is positioned. The image is formed on the surface of the ball lens, 11, at the interface between the ball lens, 11 and the fiber plate, 16. The fiber plate, 16, acting as a coherent fiber, translates the image from the curved focal surface to a flat focal surface where a flat imaging collection device, 20 is positioned. The collected image has some spatial warp by virtue of a spherical surface projected onto a plane.

Laycock's optical design is not practical for an imaging device because the ball lens index of refraction needs to be on the order of two which typically is not uniform glass and will cause image distortion from dispersion. High quality optical glass typically has lower index of refractions. The design also restricts the optical system design because the design degrees of freedom such as ball lens radius are determined by the index of refraction. The ball lenses index of refraction determines the ball lens size and the resultant field of view based on a imaging device size. Thus the design degrees of freedom are very restricted because in order to increase field of view, the detector must be enlarged. Another disadvantage of this design is not considering multiple image collection devices. The image collection device as shown must be large, or the ball lens must be small enough to accommodate the image device. A further issue with the design is the fiber plate's fibers numerical aperture disallowing acceptance of the radiation at high angles as shown in FIG. 1. Laycock addresses the numerical aperture issue by incorporating complex grating surface image collection surface on the fiber optic bundle, 16.

U.S. Publication. No. 2010/0200736 A1 by Leslie Charles Laycock et. al., shown in FIG. 2 describes an alternate approach to translate a curved focal surface onto a image plane by use of multiple optical systems, 90 and multiple fiber plates, 16, arranged at different angles, which addresses the fiber plate's numerical aperture issue. Multiple fiber plates, 16, are arranged at different angles to image onto a single image collection device, 20. The disadvantages of this design are the requirement for multiple independent lens systems, 90, and the requirement for a single large image collection device, 20.

U.S. Publication. No. 2010/0200736 design advantage is use of different radii for the half ball lenses, which allows a wide selection of optical materials and different physical optical sizes. A design disadvantage is use of a single fiber plate with a single detector. The fiber plate's numerical aperture limits the angular field of view. The optical stop's aperture is subject to the cosine effect for wide angles. Natural fiber plates are also not considered. The state of the art for artificial fiber plates causes a chicken wire effect over the image. The fiber cladding significantly reduces each fiber's micro effective aperture because only a small area is presented by the active optical fiber with the rest of the fiber's area being cladding which blocks the input radiation.

U.S. Publication. No. 2009/0303592 A1 by John Peter Oakley, describes lens systems used as a retro reflector wherein the lens system is composed of multiple symmetric ball lenses sharing a common center. The design approach allows freedom to select lower index of refraction glasses and allows the optics size to be determined by the glass selection. The design provides to the optical designer many degrees of freedom allowing a physical size to be determined in advance. The design allows the image focus on the outer ball lens surface or at an extended symmetric distance with an air gap. The disadvantage is that the patent only considers retro reflectors and does not consider this design as an imaging optical system. The design does not consider different radii for the second half ball lens, thus restricting the design degrees of freedom. The design fuses the entire surface between the two half ball lenses, thus requiring very similar coefficient of expansion materials for the two half ball lenses. The only area that is best optically fused is the very center of the assembly where a natural optical aperture in an optical stop assembly would be placed for an imaging system.

U.S. Pat. No. 6,320,703 B1 by Chungte W. Chen et. al., describes an imaging system composed of two half ball lenses fused together with the half ball lenses of different radii and the curved focal surface at some distance from the two half ball assembly. At the curved focal surface a fiber optic plate, referred to as a fiber optic relay, translates the focused image from the curved surface to a flat surface where an image intensifier is located. A disadvantage is that only a single detector is considered, which restricts field of view because of the fiber relay's numerical aperture. The numerical aperture reduces and cuts off the input radiation at high angles. Another disadvantage is not considering multiple fiber relays with their own image intensifiers, allowing for multiple image collection devices. The disadvantage of optically fusing the entire plane of the two ball lenses as described above also applies.

U.S. Pat. No. 5,311,611 by Richard A. Migliaccio presents a wide imaging ball lens design shown if FIG. 3 using two half ball lens 12 and 13 of different radii. The optical design provides a curved focal surface, 14 congruent with the half ball lenses curved surface. A fiber plate, 16, is formed to conform to the image curved surface, 14, with the opposite fiber plate end being flat and formed to the flat CCD. An optical stop, 30, is placed at the interface between the ball lens 12 and 13 to provide an optical stop. The optical stop, 30, is aligned so that the aperture is at the geometrical center of the two ball lenses 12 and 13. FIG. 4 shows the optical stop 30 with its aperture, 31.

Migliaccio does not consider multiple fiber plates with multiple detectors.

U.S. Patent No. 2002/0085278 A1 by Aleksandra Kolosowsky describes an optical faceplate used as a projection display. The patent teaches characteristics of ulexite, and identifies other fiber plate materials both artificially grown and naturally occurring. The patent teaches that fiber plates can be seamlessly positioned to form an image projection surface. The patent teaches that synthetically grown fiber plates are superior in quality free from impurities. These synthetically grown fiber plates are considered natural for the purpose of this patent in order to distinguish between man made fiber plates or faceplates which are referred to as artificial. Man made fiber plates introduce image distortion, thus the longer the fiber plate, the more image distortion.

Kolosowsky does not consider application of the fiber plate as a method to translate an image from a curved focal surface to a planer focal surface.

U.S. Publication. No. 2002/0096629 A1 by James Korein teaches a method to spatially compress an image in order to fit onto a detector by providing a tapered fiber in a fiber bundle. The design is restricted to use of artificial fiber cables. Fibers are assigned to a certain pixel, thus avoiding both image distortion and the image chicken wire effect. The taper degrades the image resolution by taking an area off of the image surface and reducing its size to fit the pixel. The requirement to assign a fiber to each pixel is straight forward in concept, but very difficult to achieve, thus not a practical solution.

Natural fiber plates have fibers much smaller than the diffraction limit, and are naturally parallel making the mineral a coherent fiber plate. Assigning a pixel to a particular fiber is unnecessary since several fibers may service a single pixel. The fiber diameters are on the scale of nanometers. The natural fiber plates do not introduce image distortion.

U.S. Publication. No. 5572034 by Andrew Karellas teaches a method to generate a seamless image for X-ray images by using two or more fiber plates and two or more optical detectors. Fiber plates on object side are seamlessly placed on the image surface, and used to channel the image to separate detectors on the image side of the fiber plate. Artificial fiber plates are only considered. In one version, only flat image planes and flat CCD planes are considered which does not naturally separate the detectors, and does not provide sufficient volume for the multiple detectors. Restated, this dilemma is caused because of the parallel plane geometry. To resolve this dilemma, the fiber plates are softened with heat and twisted to form a bend, which allows space for the second detector. A curved image surface would allow the fiber plates to have a natural different angle when all placed with their centers perpendicular to the surface. A radial distance from a spherical surface also provides more area based on the square of the radius rather than the linear relationship of the length of the fiber plates. A second version angles the adjacent fiber plates with respect to each other, which separates the detectors, but does not provide the volume as would be achieved by a radial geometry wherein each fiber plate were positioned vertical to a spherical surface.

The fiber plate design maintains a flat object side to the fiber plate. The possibility of forming the object side of the fiber plate to a curved images surface is neglected, possibly to avoid image distortion.

The application is concerned with X-ray imaging and does not consider the application to wide field imaging.

U.S. Publication. No. 5349180 by Arthur H. Vaughan, teaches a optical imaging design using multiple coherent fiber cables mapping the curved image surface to a single flat detector. The design teaches the natural optical stop provided by the fiber optics numerical aperture. The design will not provide a high quality image because of the chicken wire effect caused by the fiber cladding. Multiple detectors are also not considered, restricting the image resolution to the particular size of a given detector versus area coverage.

U.S. Pat. No. 5,159,455 by John D. Cox et. al., teaches a method to obtain a high resolution image by use of a composite of multiple fiber bundles and multiple sub-images. Cox does not use the natural advantage of the geometry wherein if the fiber plates are arranged perpendicular to a curved surface, the geometry generates volume for the sensors without the need for a tapered fiber plates. The design also uses tilted fiber plates that are not tapered, but neglects the geometric advantage of a curved focal plane and the capability to match the fiber plate to a curved focal plane.

U.S. Pat. No. 4,323,925 by Gurdon R. Abell et. al., teaches a method to obtain a high resolution image by use of multiple CCD sensors integrated with fiber plates. Fabricating the fiber plates with a larger input aperture, and forming the fibers to a smaller output aperture obtains the space required for the individual detectors. The individual fibers are tapered in nature accordingly.

The design presumes an image plane, neglecting the natural curved image plane gained without field flatteners. If the fiber plates are arranged perpendicular to a curved surface, the geometry generates volume for the sensors without the need for a tapered fiber plate. The design presumes an image plane, neglecting the natural curved image plane gained without field flatteners. The design does not take advantage of the capability to match the fiber plate to a curved focal plane.

SUMMARY OF THE INVENTION

What is described is a unique combination of existing optical design features that describe a wide angle, high resolution, staring image collection system. The design is described as being, refractive, staring, wide angle and practical to build. The advantages are, no moving parts, small size being compact, high resolution, near two pi steradians solid angle field of view and with very rugged optics. The optical design uses ball and/or half ball lenses all arranged in a monocentric manner sharing a common center of curvature, and having a spherical image surface. A unique feature is use of multiple spherical-planer fiber plates on a refractive optical system, to map the image from the curved surface to multiple planar detectors. The Fiber plates resolve a host of design issues as compared to typical current optical designs. The first issue, is translation or mapping of the image off of the curved surface to the flat image collection device which allows use of current image collection devices. The fiber plates simplify the optical design by not requiring flattening optics, reducing the number of lenses required, and allowing use of spherical lenses for a wide angle field of view.

The optical system using fiber plates is simple to build and thus practical. The natural mineral and synthetically grown fiber plates do not have any image distortion over the length of the crystal. The synthetically grown fiber plates reduce impurities and also can improve image quality with smaller diameter fibers. The natural mineral and synthetically grown mineral fiber plates can be contoured without introducing image distortion whereas all artificial fiber bundles and fiber cables can introduce image distortion.

The use of multiple fiber plates, also referred to as fiber faceplates, on a refractive optical system is unique. The mineral fiber plate will not introduce any image distortion while the artificial fiber plate, or faceplate, will introduce some image distortion. Another unique feature is use of the fiber plate's length to provide a radial translation away from the image surface into a larger volume, allowing placement of multiple image collection devices. The multiple fiber plates also resolve the fiber plate's numerical aperture issue by allowing the designer to select the maximum radiation input angle into the fibers consistent with the fiber's numerical aperture, and not restrict the total field of view. The fiber's numerical aperture thus acts to an advantage as a baffle to reduce stray light.

Artificial fiber plates are made by attempting to lay fibers parallel, then fusing and sometimes stretching the fused bundle. Some image distortion results. Whereas natural minerals such as ulexite, trona and halotrichite provide a distortion free image over any fiber plate length. The use of holders for minerals that are fragile minerals such as such halotrichite is unique. Also unique is treating internal and external surface of the fiber plate parallel to the fibers with light absorbent materials to reduce stray light.

The images from the multiple image collection devices can be stitched together via software to form a single large image up to a solid angle of two pi steradians. The fiber plates can be seamlessly positioned on the curved image surface for a seamless image if desired, or positioned with gaps. The optical system described is an alternative to multiple optical systems each with their own optics, or scanning systems. This design, unique to this invention, uses a single refractive optical system with multiple fiber plates and image collection devices, allowing high resolution surveillance of any solid angle up to two nearly two pi steradians. High resolution defined as spot sizes on the order of one to 5 microns over the visible range are obtained. Spot sizes of several microns over the full field of view are readily achievable using low index of refraction optical glasses because of the symmetry inherent in a ball lens. The resolution limit is diffraction limit described by the Airy circle.

Fiber Plates greatly simplify the optical design for image collection devices because image flattening optics are not required. The resultant optical systems can be very rugged because of possible one piece designs wherein the lenses may be fused into a single unit including the fiber plates and the detectors.

This invention takes full advantage of the ball lens symmetry. The ball lens inherent symmetry results in an infinite number of chief rays, whereas current imaging designs are restricted to a single chief ray.

Several unique optical stops are also described. These are: (a) An optical stop at the center of curvature is uniquely described as shaded in order to reduce an edge and diffraction effects. (b) Use of the center lens as an aperture to an optical stop forms a three dimensional lens optical stop. (c) A network of microgrooves on a lens surface filled with a light absorbent material forms an array of optical stops, with a single optic than acting as an aligned array of micro lenses.

The use of compliant adhesive and shims between half ball lenses is unique. The compliant adhesive allowing for coefficient of thermal expansion effects. The shims may also act to mitigate coefficient of thermal expansion, but also act to maintain a conductive outer mold line for military applications. Shaving the lenses at the planar intersection to accommodate the shims is unique.

This invention's primary object is to provide a high-resolution scene surveillance over nearly a two pi steradians solid angle, or any subset angle with use of a single optic without need of moving parts.

A second objective is to provide a very compact, rugged optical design that may be inexpensively built.

A third objective is to provide a high resolution surveillance system over the full field of view, to be used as a security surveillance with applications to both commercial and military.

BRIEF DESCRIPTION OF THE DRAWINGS

FIG. 3 is an illustration of a prior art imaging device with an optical stop;
FIG. 4 is prior art showing the details of the FIG. 3 optical stop.

DETAILED DESCRIPTION OF THE INVENTION

Figure 1:
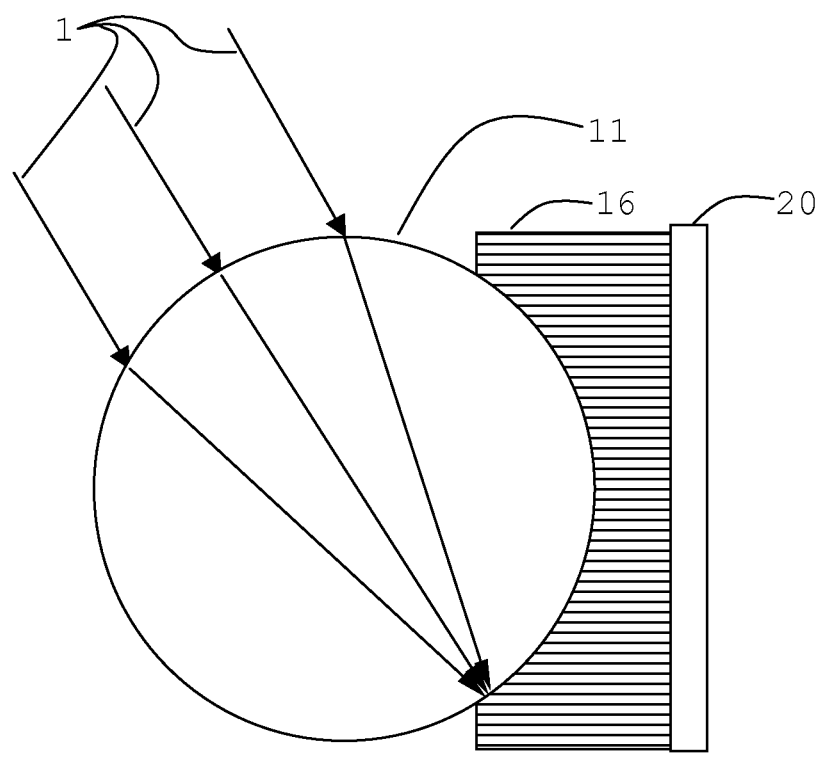
FIG. 1 is an illustration of a prior art imaging device.
Figure 2:
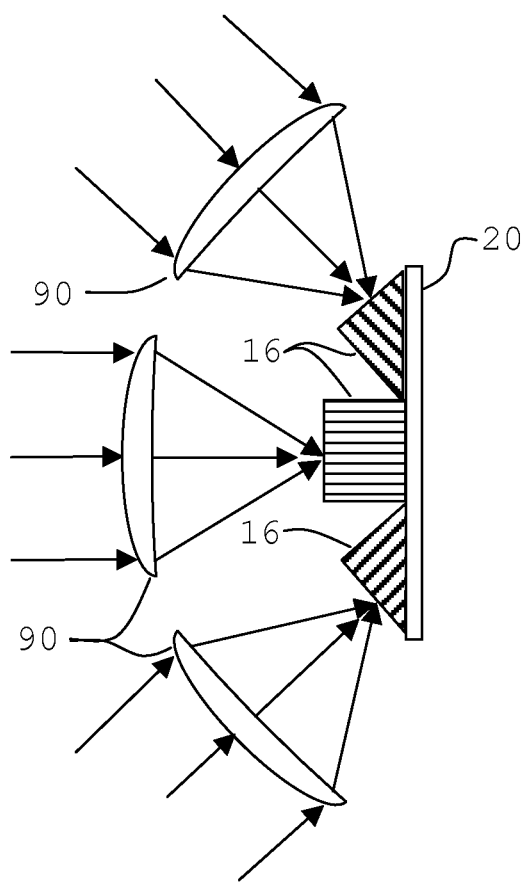
FIG. 2 is an illustration of a prior art imaging device.
Figure 5:
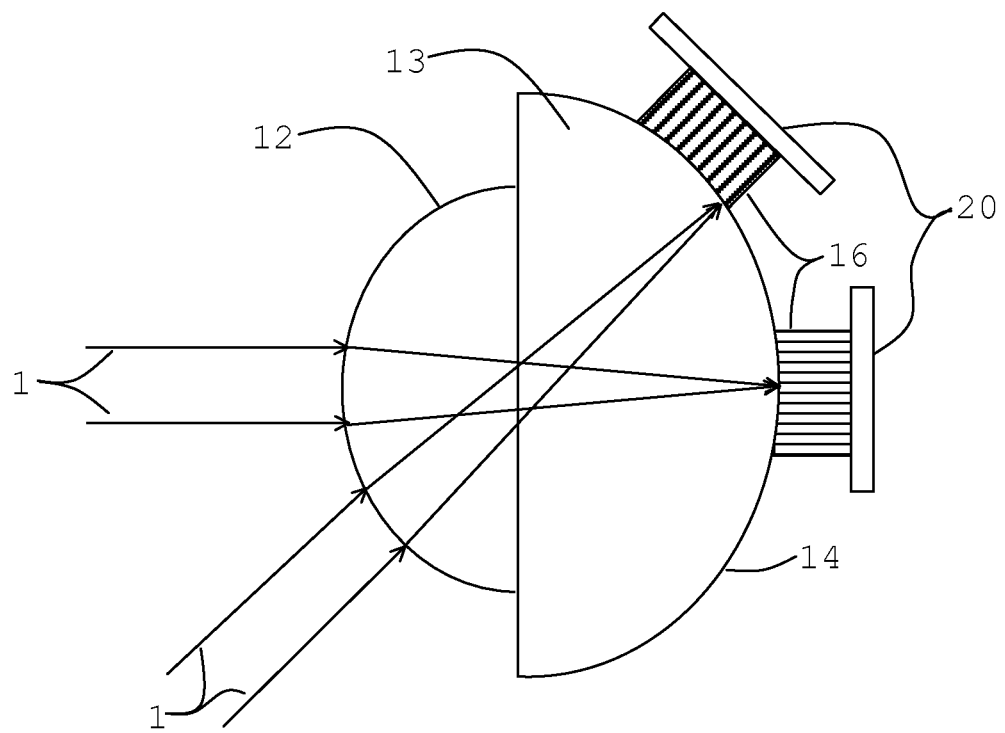
FIG. 5 shows a simple embodiment of the invention with multiple detector arrays installed on a single optical system.

FIG. 5 Detailed Description

FIG. 5 is a side view showing two half ball lens, 12 and 13, with the spherical centers superimposed. FIG. 5 is a simple optical design composed of two half ball lenses, 12 and 13. The ball lenses are preferably optically fused at the center area defined by the aperture or fixed together with index of refraction adhesive. If an air gap is allowed between lenses 12 and 13, anti reflective coating is best applied to the surfaces. However, if not optically fused, the field of view is limited by the critical angle of reflection. The planer area outside of the center aperture area may be free or adhered with a compliant material to compensate for coefficient of thermal expansion. The compliant material may also act as part of an optical stop, being the light absorbent barrier. In the simplest design, ball lenses, 12 and 13, are the same index of refraction in order to avoid reflection and/or refraction at the interface between 12 and 13; however, different index of refractions complicate the design but also provide design advantages. An antireflective coating may be added if an air gap or dissimilar index of refractions are used for half ball lenses 12 and 13.

The FIG. 5 design allows freedom to select many optical materials because both the size of ball lens 12 and 13 are selected for best optical focus.

Input radiation, 1, is focused onto an image surface, 14. Fiber plates, 16, with a curved surface at one end, conforming to the focal surface, are positioned on the image surface, 14. The fiber plates, 16, translate the image from the curved image surface, 14, to the flat image collection device, 20 while preserving image focus. The fiber plates, 16, flatten the image surface and translate the image into a larger spherical volume allowing space for the multiple imaging devices, 20.

Figure 6:
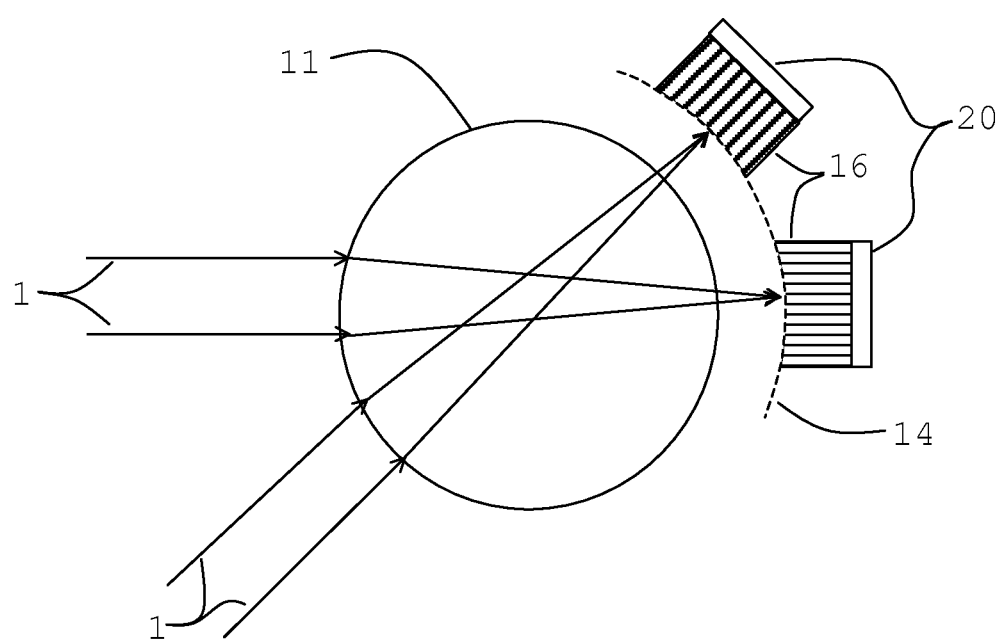
FIG. 6 shows an alternative optical design with the fiber plates behind an air gap on the focal surface.

FIG. 6 Detailed Description

FIG. 6 shows an alternate design using a single ball lens, 11 wherein the curved image surface, 14, is located in air with an air gap between the image side of ball lens, 11 and the spherical focal surface 14. Ball lens 11 and spherical image surface are monocentric about the same center of curvature.

The input radiation, 1, is focused by the ball lens, 11, onto the curved image surface, 14 where the fiber plates, 16, are formed curved to match the curved image surface, 14. The fiber plates, 16, translate the image while maintaining image focus to the flat image collection devices, 20. The fiber plates, 16, can be positioned contiguous or on any location over the two pi solid angle image surface, 14.

The design advantages over FIG. 5 design are lighter weight and single ball lens optics. The design advantages over the prior art are choice of high quality optical glasses with lower index of refractions, which determines ball lenses, 11, size.

Figure 7:
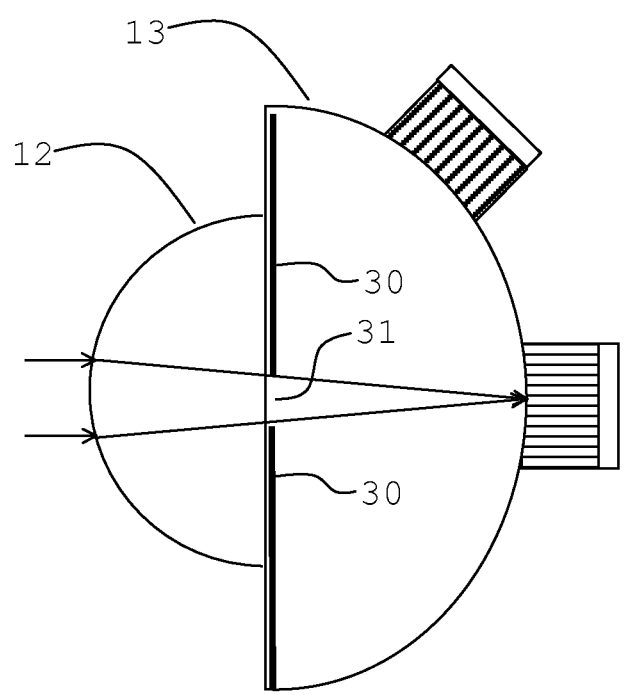
FIG. 7 shows the imaging device of FIG. 5 with the addition of an aperture stop.

FIG. 7 Detailed Description

FIG. 7 shows the addition of an aperture stop, 30, to the FIG. 5 design. The aperture stop with its opening, 31 are shown displaced from the center of the ball lenses, 12 and 13 for illustration purposes. The stop is placed at the interface between ball lenses 12 and 13, with the aperture, 31, collocated at the centers of half ball lenses 12 and 13.

The stop, 30 may be formed by a radiation absorbent dye or a non transparent shim formed of any material including the potential adhesive fixing lenses 12 and 13 together. The thickness of the shim, 30, must be compensated if full two pi steradians solid angle is desired. Compensation is achieved by shaving lenses 12 or 13, or both to accommodate the optical stop, 30 thicknesses.

Figure 8:
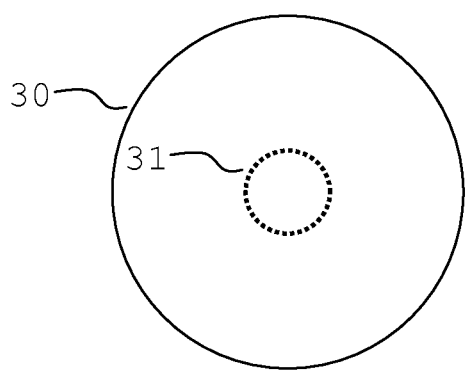
FIG. 8 shows a unique aperture design different from the prior art shown in FIG. 4.

FIG. 8 Detailed Description

The aperture stop, 30, includes optional features.

An optional feature is aperture, 31, with diffuse edges, which avoids diffraction effects. FIG. 4 in the prior art shows the aperture stop with sharp edges.

The aperture in the optical stop assembly in the preferred embodiment is optically fused or cemented with index matching adhesive.

Another optional feature is using the optical stop structure as a compliant adhesive, which allows for thermal coefficient of expansion differences between optical groups one and two.

Figure 9:
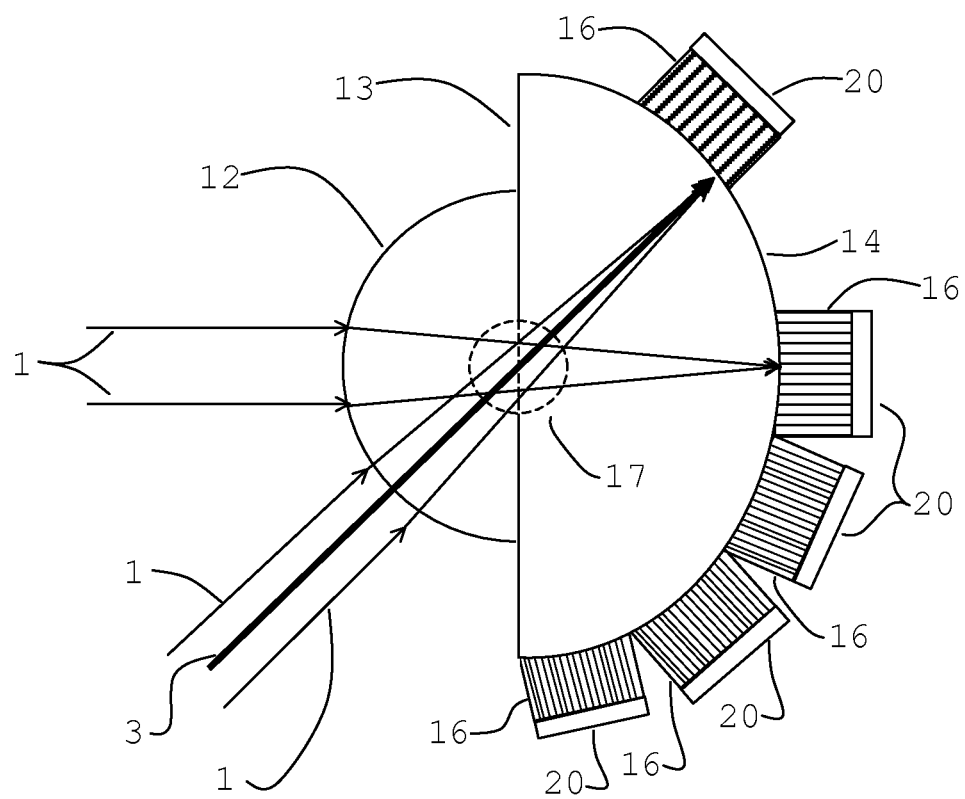
FIG. 9 shows the preferred embodiment's optical design with addition of an inner ball lens, which may also act as an aperture in an optical stop.

FIG. 9 Detailed Description

FIG. 9 shows the preferred embodiment, which consists of two half ball shell shaped lenses, 12 and 13 with their respective centers aligned together. At the center of the lenses 12 and 13 assembly is a third half and/or full ball lens, 17 with its center also aligned to lenses 12 and 13. If the center hall lens, 17 has the same or very similar index of refraction as half ball lens, 13, the image side half ball lens 17, may be deleted from the design because the half ball lens 13, acts as the image side half ball lens, 17. The drawing shows a full ball lens, 17. The lenses, 12, 17, and 13 may be anti reflection coated. Narrow acceptance angles for the anti reflective coatings improve the optical performance by reducing stray light.

The preferred embodiment's design advantages are design degrees of freedom to select the index refraction of lenses 12, 17 and 13, allowing for low dispersion glass materials as well as determining the desired system size.

The object side of ball lens, 17 may also act as a three dimensional aperture in an optical stop with the rest of the planar area between half ball lenses 12 and 13 fabricated as an optical stop. The use of half ball lens 17 as an aperture in an optical stop avoids the cosine effect as compared to the aperture stop defined in FIGS. 4 and 8, and further enhances the symmetry advantages available with ball lenses.

FIG. 9 shows input radiation focused by the optical assembly onto a curved image surface, 14 which is coincident with the curved surface of object side half ball lens, 13. Fiber plates, 16, are shown seamlessly positioned to translate and flatten the image sections to image collection devices, 20. Ulexite is a good choice for fiber plates, 16 because its numerical aperture is 15 to 35 degrees. The different fiber sizes in ulexite cause the variance in numerical aperture. The fiber plate's numerical aperture determines the least number of fiber plates if a seamless panorama is desired, and the maximum angular field of view for a single detector. For instance, beyond 15 degrees the ulexite fiber plate loses some of the input radiation, which crosses over to adjacent fibers. Ulexite also has a total cutoff at 35 degrees, thus three fiber plates per 90 degrees field of view is a reasonable compromise. These fiber plates are best synthetically grown which reduces impurities and are considered natural fiber plates in this patent as opposed to an artificial fiber plates which are fibers with cladding fused together and potentially stretched to obtain smaller fiber diameters. Artificial fiber plates are nearly coherent because the fibers are not truly parallel, with the decrease of coherence is increased with fiber plate length.

FIG. 9 shows a chief ray, 3, which has lost its meaning because of the optical symmetry. An infinite number of chief rays may be shown on this optical design. Input radiation, 1 is shown from two different angles to illustrate the infinite number of possible chief rays in the invention.

FIG. 9 also illustrates the function of the fiber plates, 16 to flatten the image and translate the image into a larger volume that supports multiple image collection devices.

The inner spherical surfaces of lens 12 and 13, is formed to the same curvature as lens 17 and preferably optically fused at the aperture in the optical stop, and adhered with compliant adhesive cement, or allowed to move freely.

Additional ball lenses may also be added, all sharing a common center of curvature; however, the current design achieves excellent imaging results, described in the following tables. Table 1 shows an example design, which achieves a three microns spot size over a bandwidth from 546 to 643 microns. Restricting the bandwidth reduces the spot size further. The Table 1 example has a full ball lens 17, an optical stop array on the object side of lens 12 with apertures one millimeter in diameter. Placing the optical stop aperture on the input aperture of lens 12 provides sharper imaging than placing the optical stop's aperture at the center of lens 17.

TABLE 1

| Ball lens | Radius mm | Material | Index of Refraction |
|-----------|-----------|----------|---------------------|
| 12 | 10 | FCD10 | 1.456 |
| 17 | 2 | FCD1 | 1.49 |
| 13 | 17.73 | K7 | 1.511 |

Another example of the FIG. 9 optical design is taught in U.S. Publication. No. 2009/0303592 by John Peter Oakley for use as an optical retro reflector. The optical design is a three lens system comprised of two half ball lenses of 60 millimeters in diameter with a inner ball being of 38.7 millimeters. The design provides an excellent optical imaging system. The design is presented in Table 2. Optical stops were added to the design in two places. One placed at the lens's 12 object side surface, and second at the lenses spherical center. The optical stop apertures on the object side of lenses 12 provided the sharpest image, as compared to placing the optical stop aperture at the center of lens 17. Both designs yielded spot sizes of three microns or better over a bandwidth of 546 to 643 microns.

TABLE 2

| Ball lens | Radius mm | Material | Index of Refraction |
|-----------|-----------|----------|---------------------|
| 12 | 60 | H-QK1 | 1.47 |
| 17 | 38.7 | H-LAK3 | 1.749 |
| 13 | 60 | H-QK1 | 1.47 |

Table 3 is an example of the FIG. 9 design using ball lens 17 as the aperture in an optical stop with the planer surface between half ball lenses, 12 and 13 acting as an optical stop. A spot size of five microns is achieved with lens 17 acting as the aperture in a three dimensional optical stop. Half Ball lens 13 is selected to match the optical index of refraction of ulexite fiber plates.

TABLE 3

| Ball lens | Radius mm | Material | Index of refraction |
|-----------|-----------|----------|---------------------|
| 12 | 8 | FCD10 | 1.46 |
| 17 | 0.5 | FC5 | 1.49 |
| 13 | 11.2 | K10 | 1.5 |

Figure 9A:
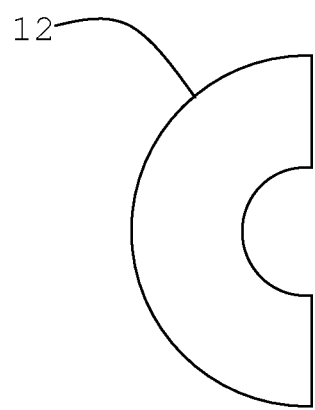
FIG. 9a shows a shell shaped half ball lens.

FIG. 9a Detailed Description

FIG. 9a shows the shell shaped half ball lens 12. This lens may act on both the object and image side, as well as an inner lens or as an outer most lens.

Figure 10:
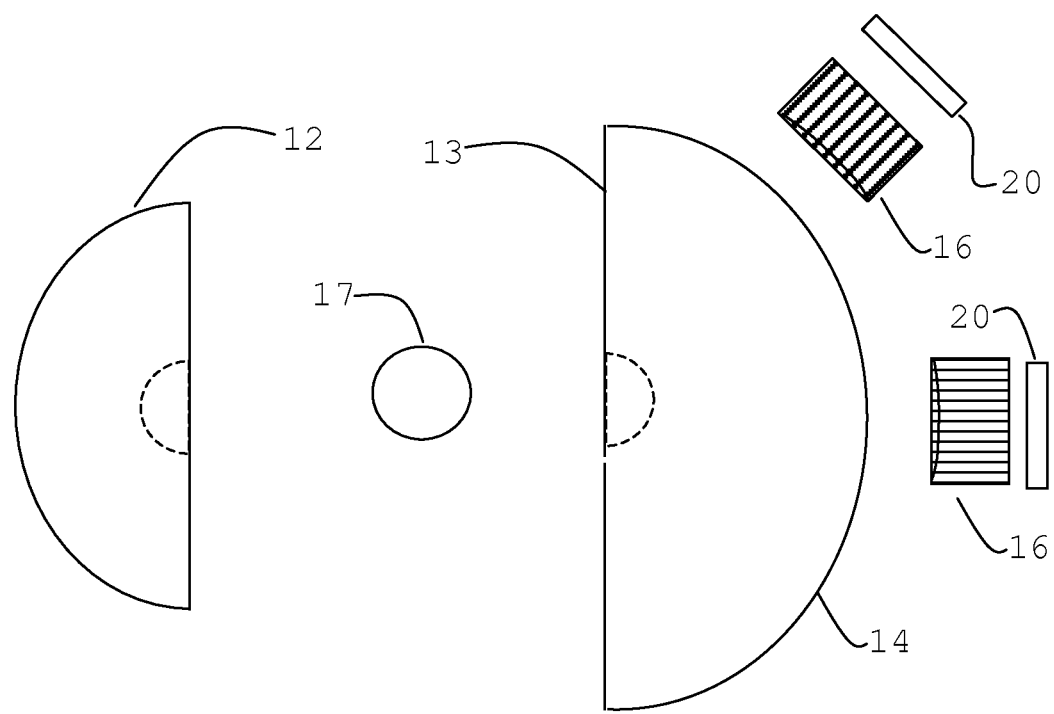
FIG. 10 shows an exploded view of the preferred embodiment.

FIG. 10 Detailed Description

FIG. 10 shows an exploded view of the preferred embodiment. The input aperture formed by the ball lens, 12, is shown with a hollow inner core where in the ball lens, 17 is positioned. Ball lens, 17 may be adhered, optically fused, or fitted allowing a small air gap. The half ball lens, 13, is also shown with the hollowed center to be fitted to the inner ball lens, 17.

The lens assembly is a three optics system. The lenses 12, 17, and 13, may be fused or fixed with adhesive to each other. A preferred assembly that compensates for dissimilar coefficient of expansion, is to fuse half ball lens 12 to ball lens 17, and ball lens 17 fused to half ball lens 13, allowing the interface between 12 and 13 to be free to accommodate dissimilar thermal expansion, or use of compliant adhesive.

The fiber plates, 16, may be placed contiguous on the image surface, 14, allowing seamless image collection between the multiple image collection devices, 20. The fiber plates may also be positioned allowing for image gaps between fiber plates, but fully utilizing the image capturing device active area. Similarly, subsets of the total solid angle field of view on the image surface, 14, may be captured. For instance at a four way traffic intersection, only four image plates will fully cover the intersection.

Figure 11:
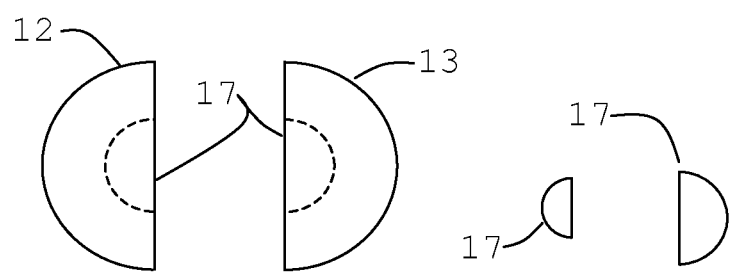
FIG. 11 shows an alternate design for the radii of the inner and outer half ball lenses of FIG. 10.

FIG. 11 Detailed Description

FIG. 11 shows optional half ball lens with different radii. Half Ball lenses 12 and 13 may be of the same radii, and inner ball lens 17 may be composed of one full ball lens or two half ball lenses with different radii. The advantage of using half ball lenses is providing design degrees of freedom, which allow selection of different radii and index of refractions for the two half ball lenses. This design freedom allows use of different glasses, and selection of the optics size or designing to the image collection size. The optical symmetry offered by half/full ball lenses and a spherical image surface provides a high resolution optical systems.

Figure 12:
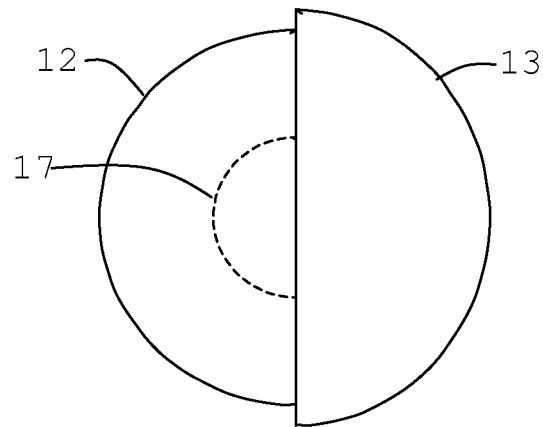
FIG. 12 shows a design using three half ball lenses.

FIG. 12 Detailed Description

A simplified design is formed as compared to the design in FIG. 9 when the second half of ball lens 17 is the same material or same index of refraction material as half ball lens 13. In this simplified design the second half of ball lens 17 does not exist, reducing the assembly to three half ball lenses. The interface between half ball lens 17 and 13 is best optically fused, or adhered with index matching adhesive. The radii of half ball lenses 12 and 13 may also be different or the same.

An example of the FIG. 12 optical design using higher index glass materials is presented in table 4. The assembly is a half ball lens, 12 with a half ball lens, 17 fitted into the center of the first half ball lens. The assembly is made up of three half ball lenses. An optical aperture of one mm diameter is placed at the center of the half ball lenses resulting in a spot size of three microns. If an optical structure aperture array is constructed at the surface of lens, 12, the spot size is reduced to one micron over the waveband 546 to 634 microns.

TABLE 4

| Half Ball lens | Radius mm | Material | Index of Refraction |
|---|---|---|---|
| 12 | 10 | F5 | 1.63 |
| 17 | 2 | N-SSK5 | 1.66 |
| 13 | 17.73 | N-SSK5 | 1.66 |

Figure 13:
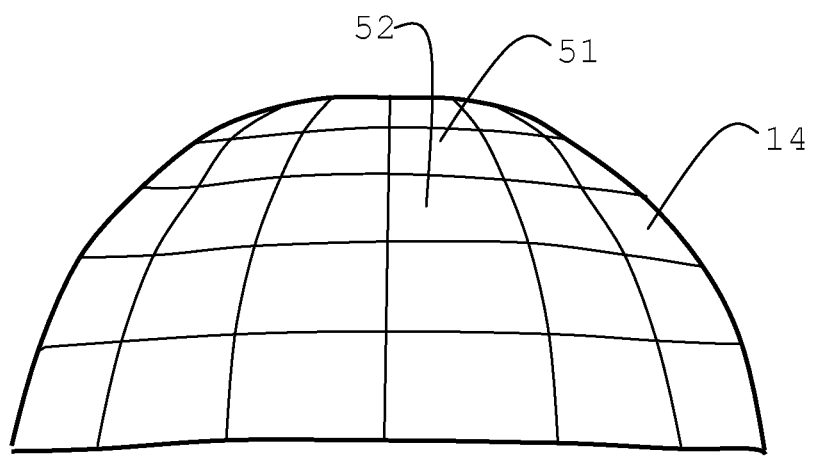
FIG. 13 shows a seamless mapping for the fiber plates on the curved focal surface to achieve a seamless image.

FIG. 13 Detailed Description

FIG. 13 shows the curved focal surface 14, and the seamless mapping of the fiber plates to obtain a full two pi steradians field of view devoid of blind spots. Contiguous placement of the fiber plates requires a slight trapezoidal geometry as shown in FIG. 13. To obtain a 360 degree circumferential view, only the bottom rows are required.

Most image collection devices are square or rectangular, thus any trapezoidal shape wastes part of the image collection device area. It should be noted that the image collection devices may be of different sizes, and different capabilities. To illustrate the different size possibilities, smaller image collection areas are shown in FIG. 13 near the top of the curved image area preserving the mapping symmetry. However, adjacent mapping areas may be combined to a single fiber plate, for example the two areas identified as 51 and 52 may be combined to a single detector or assigned to separate detectors. The maximum area that can be mapped to a detector is determined by the fiber plate's numerical aperture and detector size.

Figure 14:
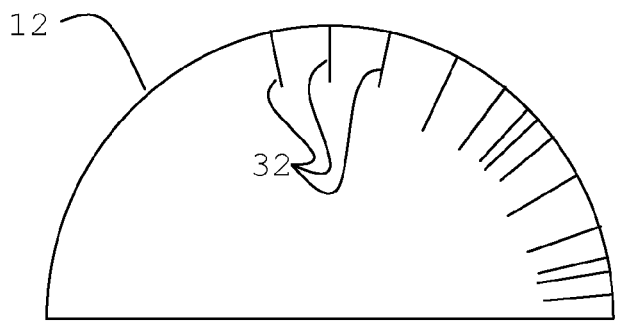
FIG. 14 is a cross section of the half ball lens, showing the construction of an optical stop structure on the input aperture.

FIG. 14 Detailed Description

FIG. 14 shows a cross section of half ball lens 12, with some of the aperture stop's channels machined into the lenses spherical surface. The channels, 32, are in a radial position with respect to the center of the lens, 12. The depth of the radial channels, 32, determines the angular acceptance angle for that particular aperture, and the size of the aperture determines the resolution, or optical spot size. The channels are filled with a light absorbing material such as carbon black in a binder. Laser machining may form the channels. Only several of the channels are labeled 32 in FIG. 14 for drawing simplicity.

Any lenses in the optical design may be selected on the object or image side; however, best resolution is achieved by placing the optical stop array on the first lens, 12, on the object side.

The apertures in the optical stop may vary in size, dependent on resolution desired at that particular angle with an option to only partially fabricate the optical stop structure over the lens surface. Multiple optical stop arrays may also be incorporated into the design; however, excellent results are achieved with the stop on the first surface of the object side. The aperture in these stops may be selected to obtain spot sizes on the order of two microns over the visible band. The optical stop's structure resembles an insect's eye, and each aperture acts as a separate micro lens optically, but by virtue of being part of the same half ball lens, maintains optical alignment. The aperture array geometries are important, because each aperture behaves as a single optical unit, and the smaller the apertures fitted into a given area the more resolution.

Figure 15:
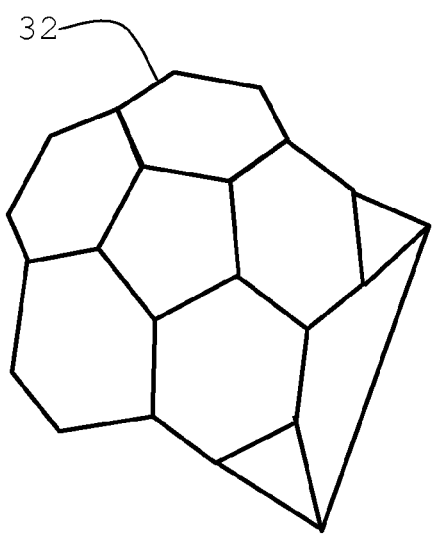
FIG. 15 is a surface view at the ball lens input aperture showing the pattern of the optical stop structure.

FIG. 15 Detailed Description

FIG. 15 shows an illustration of the optical stop structure, 32, with part of the surface pattern as viewed directly at the surface of the input aperture lens shown in FIG. 15. The apertures may be of any shape or differing sizes.

Figure 16:
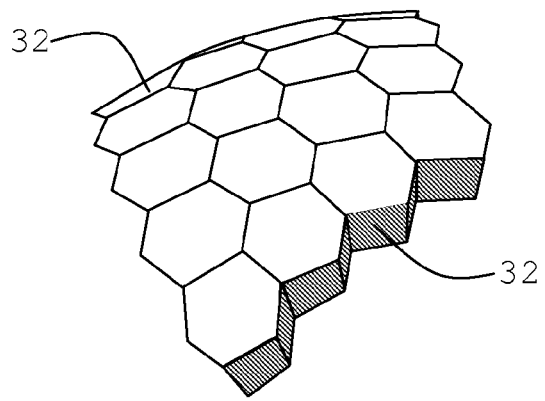
FIG. 16 is an isometric view of the aperture stop structure.

FIG. 16 Detailed Description

FIG. 16 shows a cutaway of the optical stop, 32. Different shapes other than hexagonal may be utilized, not shown. The optical stop structure may also not be uniform but may vary in aperture size over the lens to obtain desired optical performance at different angles, also not shown. A varying aperture mimics nature and the insect eye. Smaller apertures are found in some parts of the insect's eye, those parts that are most often used for more accurate vision.

Figure 17:
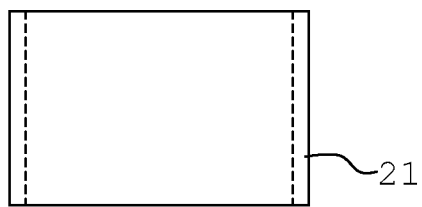
FIG. 17 is a side view of the fiber plate's housing.

FIG. 17 Detailed Description

FIG. 17 shows a side view of a holding unit, 21, to be used for the fiber plates. The packaging unit is necessary in order to utilize some of the better naturally occurring fragile fiber plates.

Artificial fiber plates have a small part of the area active because the fibers are clad with non transparent material, unlike naturally occurring fiber plates which have superior packing. The cladding on the artificial fiber plates also results in a chicken wire effect on the image. Therefore use of natural fiber plates such as ulexite, trona and halotrichite, to name a few, are the best selection. Ulexite's fiber cross sections vary from 0.06 millimeters squared to 0.75 millimeters squared. The best naturally occurring fiber plate identified by Gretta S. Baur, et. al., in publication "IMAGE PROJECTION BY FIBROUS MINERALS" is halotrichite whose fibers range in width from 0.001 millimeter to 0.005 millimeter. Halotrichite is very fragile, requiring the holder as described herein.

The inside section of the holders, 21, is best treated with light absorbent material because fiber cross talk does occur with the natural fiber plates. A fiber plate without a holder is also preferably treated with a light absorbent material on its sides for the same reasons. A single fiber plate may also be constructed of sections of natural fiber plates having the mating sides treated with radiation absorbent materials.

Natural fiber plates transmit light not only along the fiber, but at an angle to the fiber because natural fiber plates do not have light absorbent fiber cladding. The fiber to fiber transmission is similar to the classical cross talk as referred to in pixel imaging becoming an unwanted stray light source. By sectioning the fiber plate and introducing light absorbent surfaces within the single fiber plate. These light absorbent surfaces act like baffles, reducing the unwanted light.

Figure 18:
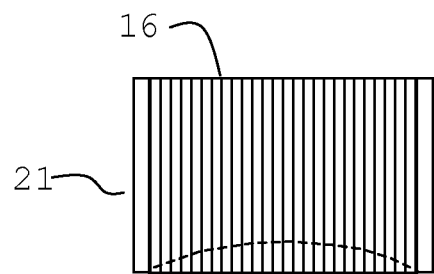
FIG. 18 is a cutaway side view of the fiber plate's housing, with the fiber plate, in the fiber plate housing.

FIG. 18 Detailed Description

FIG. 18 shows a side view cutaway of a packaging unit, 21, with the fiber plate, 16, installed.

Figure 19:
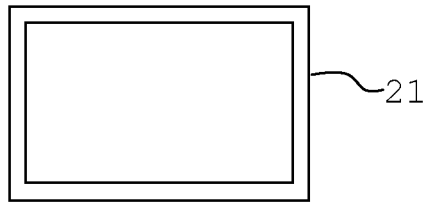
FIG. 19 is a top view of the fiber plate's housing.

FIG. 19 Detailed Description

FIG. 19 shows a top view of the empty fiber housing, 21.

Figure 20:
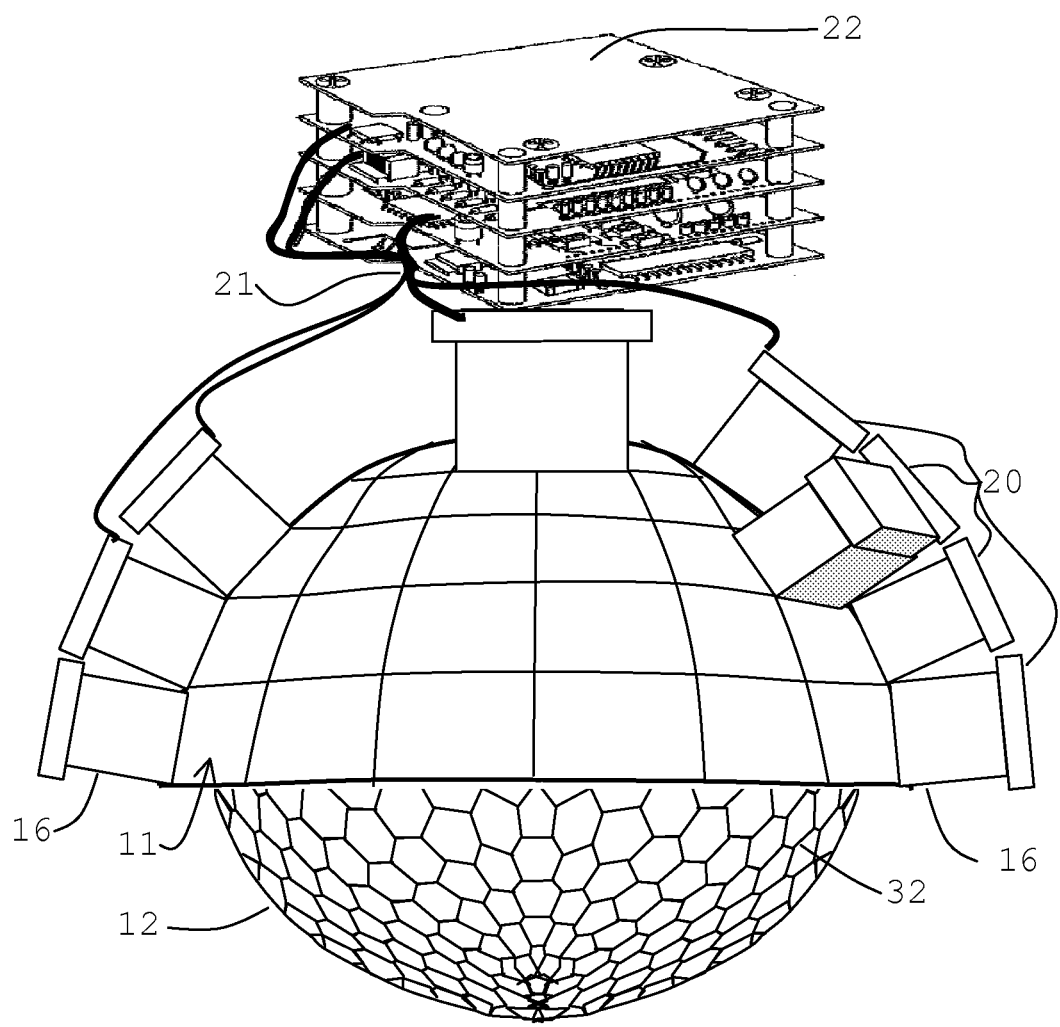
FIG. 20 shows a three dimensional concept of the imaging optics system with its electronics.

FIG. 20 Detailed Description

FIG. 20 shows the fully integrated surveillance system without the housing. The input lens 12 is shown with the aperture stop structure, 32. The curved focal surface, 11 is shown with the areas to be mapped by the fiber plates, 16, and image collection devises, 20. For simplification not all of the fiber plates and image collection devices are shown. Some cables, 21 are shown between the image collection devices, 20 and the controller, 22. Not all cables are shown in order to improve drawing clarity. A controller, 22, controls and collects the imagery from each image collection device. The controller performs such actions as controlling the integration rate, timing, binning and gain for each individual sensor. The controller, 22, may also perform any image processing, and stitch together the imagery.

What is claimed is:

1. A high-resolution refractive optical imaging system that supports close to a two pi steradians solid angle field of view comprising:
   one or more spherical optical elements disposed in such a manner that all of the spherical surfaces thereof share a common center of curvature, the imaging system having an object side with the most object side spherical surface thereof receiving light from an external scene, and an image side including a spherical image forming surface,
   a plurality of fiber optical elements, each having a spherical surface on the object side and a planar surface on the image side thereof, each fiber optical element consisting of a plurality of naturally occurring, synthetically grown, or artificially produced fibers disposed in parallel in a monolithic block,
   and a plurality of image collection devices positioned on the planar surfaces of the fiber optical elements, where images incident on the spherical surface of the fiber optical elements are coherently transferred to the image collection devices through the fiber optical element to the planar surfaces thereof.

2. The optical imaging system according to claim 1 wherein the fiber optical element may be comprised of naturally occurring optical mineral fibers or synthetically grown mineral fibers forming a monolithic block or artificial optical fibers positioned parallel with said fibers fused together.

3. The optical imaging system according to claim 1 wherein the inner most optical element whose spherical surface is closest to the center of curvature acts as an aperture in an optical stop.

4. The optical imaging system according to claim 1 wherein an optical stop may be formed in the center of said optical system at the planar intersection of object and image side lenses containing the optical elements spherical center with an aperture formed by disposition of a non-transmissive material in a diffuse manner at the edge of the said aperture.

5. The optical imaging system according to claim 1 wherein on a section of a spherical optical element is formed a construction of radial channels filled with a light absorbent material.

* * * * *